United States Patent
Iverson et al.

(10) Patent No.: US 9,329,267 B2
(45) Date of Patent: May 3, 2016

(54) METHOD AND SYSTEM FOR AUTOMATICALLY DETERMINING WATER-LEVEL OFFSET, AND ADJUSTING A NAUTICAL CHART FOR SUCH OFFSET

(71) Applicant: Navico Holding AS, Egersund (NO)

(72) Inventors: Gregory Iverson, Tulsa, OK (US); Matthew Hunt, Pittsburgh, PA (US)

(73) Assignee: Navico Holding AS, Egersund (NO)

( * ) Notice: Subject to any disclaimer, the term of this patent is extended or adjusted under 35 U.S.C. 154(b) by 504 days.

(21) Appl. No.: 13/804,004

(22) Filed: Mar. 14, 2013

(65) Prior Publication Data

US 2014/0269191 A1 Sep. 18, 2014

(51) Int. Cl.
*G01S 15/89* (2006.01)
*G01S 15/02* (2006.01)
*G01C 13/00* (2006.01)

(52) U.S. Cl.
CPC ............ *G01S 15/89* (2013.01); *G01C 13/008* (2013.01); *G01S 15/025* (2013.01)

(58) Field of Classification Search
CPC ...... G01S 15/025; G01S 15/89; G01C 13/008
See application file for complete search history.

(56) References Cited

U.S. PATENT DOCUMENTS

| 8,406,470 B2* | 3/2013 | Jones | G06K 9/00201 348/135 |
| 8,543,269 B1* | 9/2013 | Wood | G01C 21/203 340/995.19 |
| 2011/0054784 A1 | 3/2011 | Wood et al. | |
| 2011/0054785 A1 | 3/2011 | Wood et al. | |
| 2014/0064607 A1* | 3/2014 | Grossmann | G06T 7/0051 382/154 |
| 2014/0269191 A1* | 9/2014 | Iverson | G01S 15/025 367/88 |

FOREIGN PATENT DOCUMENTS

WO   WO 2014149841 A1 *   9/2014   ............ G01S 15/025

OTHER PUBLICATIONS

International Search Report and Written Opinion for Application No. PCT/US2014/021154 dated May 30, 2014.
"Tips 'n Tricks 53: Setting LakeMaster Water Level Offset", [online] [retrieved May 19, 2014]. Retrieved from the Internet: <URL: HTTP://WWW.YOUTUBE.COM/WATCH?V=AHIGXPLKX10>. (Sep. 27, 2012) 1 page (XP054975408).
Porathe, T., *3-D Nautical Charts and Safe Navigation Doctoral Dissertation No. 27 3-D Nautical Charts and Safe Navigation Department of Innovation, Design and Product Development*, [online] [retrieved May 23, 2014]. Retrieved from the Internet: <URL: http://www.diva-portal.org/smash/get/diva2:120506/FULLTEXT01.pdf (Jan. 1, 2006) 1-307 (XP055119720).

* cited by examiner

*Primary Examiner* — Daniel Pihulic
(74) *Attorney, Agent, or Firm* — Alston & Bird LLP

(57) ABSTRACT

Methods and sonar system for displaying a nautical chart and for adjusting depth indicators on the chart based on a calculated offset between the actual water level and the standard water level on which the chart is based. The offset is based on sonar soundings compared to depths indicated by the chart. The sonar system's processor automatically adjusts the chart's depth indicators to reflect the offset.

25 Claims, 4 Drawing Sheets

| DATA PT. | DEPTH RING | SONAR DEPTH |
| --- | --- | --- |
| 1 | 2 - 4 | 6.8 |
| 2 | 2 - 4 | 4.5 (unidentified low point) |
| 3 | 2 - 4 | 6 |
| 4 | 2 - 4 | 5.5 |
| 5 | 4 - 6 | 8 |
| 6 | 6 - 8 | 9.5 |
| 7 | 6 - 8 | 10 |
| 8 | 8 - 10 | 11.5 |
| 9 | 8 - 10 | 10.8 (unidentified low point) |
| 10 | 8 - 10 | 12.8 |
| 11 | 10 - 12 | 12.5 (unidentified low point) |
| 12 | 10 - 12 | 15.4 (unidentified high point) |
| 13 | 10 - 12 | 14.8 |
| 14 | 12 - 14 | 15.8 |

FIG. 4

METHOD AND SYSTEM FOR AUTOMATICALLY DETERMINING WATER-LEVEL OFFSET, AND ADJUSTING A NAUTICAL CHART FOR SUCH OFFSET

FIELD OF THE INVENTION

Embodiments of the present invention relate generally to charting or cartography, and more particularly to sonar systems having a sonar display capable of displaying a chart for a body of water.

BACKGROUND OF THE INVENTION

It is common to provide charts of various types, such as topographical charts or depth charts for bodies of water, that define contour lines representing the topography. A given contour line is the locus of points that have the same value of the pertinent parameter. For example, in the case of a topographic land chart, a contour line represents a constant elevation above sea level, or in the case of a nautical chart, a contour line represents a constant depth below the water surface. Alternatively, charts can employ colors for defining the pertinent parameter. For example, the chart can use a palette of colors wherein a given color represents a range, between minimum and maximum values, of the pertinent parameter, and the complete range of the parameter over the entire area of the chart is divided into a plurality of different ranges each having a unique designated color. In the case of a nautical chart, for instance, depth ranges can be defined, e.g., 0 to 2 feet, 2 to 4 feet, 4 to 6 feet, 6 to 8 feet, etc., and each range can be differently colored. The 0 to 2 feet range may be light yellow, the 2 to 4 feet range may be darker yellow, the 4 to 6 feet range may be yellow-green, the 6 to 8 feet range may be green, and so forth. These different depth ranges, or depth areas, will typically assume the form of generally concentric rings on the chart. Degree of transparency can further be used for designating particular characteristics or features on a chart.

Digitized nautical charts are now commonly employed by boat operators for navigational and other purposes. There are various devices capable of displaying a digitized nautical chart stored on a computer-readable storage medium. Some sonar systems used by sport fishermen, for example, are capable of displaying digitized nautical charts. Some GPS devices, computer tablets, and Smartphone devices also have such capability.

It has been proposed to provide a user-selectable palette so that the user can select key aspects to be targeted on a nautical chart. For example, the user may have the ability to highlight, with a selected color, a particular depth area as defined by user-specified minimum and maximum values bounding the depth range, or the like.

While digitized nautical charts have utility for boat operators, the accuracy of any digitized nautical chart is compromised by changing water level of the body of water of interest. That is, typically a digitized nautical chart assumes a full or standard water level for that body of water. Water level is susceptible to change, however, for various reasons. On a lake, for example, water level often changes with rainfall or lack thereof. Lakes fed by dam-controlled rivers can change water level depending on how the dam is being operated by the controlling authority. Oceans, of course, change water level constantly as the tide changes.

It has been proposed to provide a user-input water-level offset for adjusting a digitized nautical chart for changing water level. More particularly, the inventors are aware of at least one currently marketed sonar display device that can display a nautical chart having contour lines labeled with respective depth values, together with a numerical depth value determined from a sonar depth sounder mounted on the boat. The user can estimate a difference between the sonar-indicated depth at the current boat position and the depth indicated by the nautical chart at said boat position. The device includes a user-input for inputting a water-level offset value (e.g., 6 feet) based on the estimated difference. The sonar display device is then capable of changing the depth values of the contour line labels on the chart by the amount of the input water-level offset.

BRIEF SUMMARY OF THE INVENTION

Embodiments of the present inventions described herein relate to methods and systems for displaying a nautical chart and for adjusting depth indicators on the chart based on a calculated offset between the actual water level and the standard water level on which the chart is based.

Thus, in accordance with one aspect of the inventions, there is a provided a method for displaying, on a display device carried on a surface water craft traversing a body of water, a depth chart for the body of water, the chart being established on the basis of a standard water level for the body of water. The method comprises steps of:
  (a) providing a digitized nautical chart for a geographic area that includes the body of water and adjacent shoreline, the chart being stored in a non-transitory computer-readable storage medium, the chart defining a plurality of different depth ranges each having a nominal depth value, the chart including information specifying the regions of the geographic area occupied by each of the depth ranges, the chart further including a unique depth range indicator for each depth range, the depth range indicator generally corresponding to the nominal depth value of the depth range;
  (b) calculating, using a sonar transducer in communication with a sonar signal processor, a sonar-indicated depth corresponding to a location on the body of water, the sonar transducer producing electrical signals indicative of depth and the sonar signal processor processing said electrical signals to determine said sonar-indicated depth;
  (c) determining, by a processor in communication with the storage medium storing the chart, a chart-indicated depth corresponding to said location;
  (d) calculating, by the processor, a water-level offset based on a comparison between the sonar-indicated depth and the corresponding chart-indicated depth;
  (e) adjusting the depth range indicators based on the water-level offset; and
  (f) displaying on the display device the chart with the depth range indicators.

Improved accuracy of the water-level offset calculation can be achieved by performing steps (b) through (d) for each of a plurality of locations on the body of water, yielding a plurality of data points for sonar depth. Then, the water-level offset is calculated based on the sonar-indicated and chart-indicated depths for the plurality of locations.

In some embodiments of the inventions, the depth ranges comprise depth rings. The depth rings generally each have one edge corresponding to a minimum value and an opposite edge corresponding to a maximum value, and the nominal depth value of such depth rings is a mid-point between the minimum and maximum values for the ring. Some depth rings may not have both a maximum and a minimum value available in the chart data, and those rings are typically represented as the minimum value (and the maximum value is typically recognized as being somewhere in the middle).

The depth rings can comprise polygon rings.

The depth range indicators can comprise colors, each depth ring having a corresponding unique color.

Various schemes can be used for calculating the depth indicated by the chart for each location. In some embodiments, the chart-indicated depth is calculated by interpolation between the two edges of the corresponding depth ring. (For those depth rings having only a minimum value, interpolation cannot be performed, and all points in the ring would have a depth equal to the minimum value.) Then an offset value can be determined for each location, and the water-level offset can be calculated by averaging the offset values for the plurality of locations.

Alternatively the non-transitory computer-readable storage medium can store a pre-calculated database corresponding to the chart, the database defining a spatial coordinate grid with a coarser resolution than a spatial resolution of the chart, the database including for each grid point a depth pre-calculated by interpolation on the chart. The database can comprise a layer of the digitized chart. In this case, the step of determining the chart-indicated depth for each location can employ any of various techniques, including but not limited to the nearest neighbor method (which uses the closest grid point), bilinear interpolation (which basically uses four corners of the grid bounding the point), bicubic interpolation (which uses a greater number of points), and the like.

In accordance with another scheme, sonar-indicated depths are determined for a plurality of different locations within one depth ring, an offset value is determined for each of these locations in the one depth ring, and an average offset value is determined for the one depth ring. Then the water-level offset can be based on the average offset value for the one depth ring.

As a refinement to this technique, the average offset value for the one depth ring and at least one additional average offset value, similarly determined for at least one additional depth ring, can be combined and used in calculating the water-level offset.

In some embodiments, statistical data analysis can be performed on the plurality of data points to determine a confidence level for each data point. Furthermore, one or more data points can be discarded based on the confidence level falling below a predetermined threshold.

It is possible in some embodiments to quantify a degree of confidence in the accuracy of the water-level offset calculated in step (d). This degree of confidence can be used in various ways. For instance, in one embodiment, the depth range indicators of the chart are adjusted in step (e) if and only if the degree of confidence is above a predetermined threshold level; otherwise, they are left alone and the standard chart is displayed.

Depth rings, such as polygon rings, have been discussed in accordance with some embodiments of the invention. However, other types of depth ranges can be used. For example, the depth ranges can comprise simple contour lines and the nominal depth values can comprise depths respectively assigned to the contour lines. Thus, for instance, the chart can include a 0-foot contour line (i.e., the shoreline), a 2-foot contour line, a 4-foot contour line, etc. The adjustment for water-level offset can then comprise adjusting the numerical label associated with each contour line. For example, if the water-level offset is determined to be −2 feet, then the 6-foot contour line would be re-labeled as "4 feet" rather than the standard "6 feet" label.

The above-described method can be implemented in various types of devices. In accordance with some embodiments of the invention, there is provided a sonar system for being carried on a surface water craft traversing a body of water. The sonar system comprises:

a transducer assembly for emitting depth-sounding sonar pulses and receiving echo returns therefrom indicative of a depth to the bottom of the body of water beneath the water craft, the transducer assembly converting the echo returns into electrical signals;

a sonar signal processor in communication with the transducer assembly to receive the electrical signals therefrom;

a display device in communication with the sonar signal processor; and a non-transitory computer-readable storage medium on which is stored a digitized nautical chart for a geographic area that includes the body of water and adjacent shoreline, the storage medium being in communication with the sonar signal processor, the chart being established on the basis of a standard water level for the body of water, the chart defining a plurality of different depth ranges each having a nominal depth value, the chart including information specifying the regions of the geographic area occupied by each of the depth ranges, the chart further including a unique depth range indicator for each depth range, the depth range indicator generally corresponding to the nominal depth value of the depth range.

The sonar signal processor is programmed to cause the following steps to be performed in the processor or under control of the processor:

(a) processing the electrical signals from the transducer assembly to determine a sonar-indicated depth associated with a location of the water craft at the time the transducer assembly emitted the sonar pulses;

(b) determining, based on the chart stored in the storage medium, a chart-indicated depth corresponding to said location;

(c) calculating a water-level offset based on a comparison between the sonar-indicated depth and the corresponding chart-indicated depth;

(d) adjusting the depth range indicators based on the water-level offset; and (e) causing the display device to display the chart with the depth range indicators.

In some embodiments the sonar signal processor receives a GPS signal from a GPS device on the water craft, the GPS signal being indicative of geospatial coordinates of the location of the water craft. The processor is programmed to look up in the chart stored in the storage medium, using any of the previously noted techniques, depth information associated with the geospatial coordinates indicated by the GPS signal.

When steps (a) through (c) are performed for each of a plurality of locations on the body of water, yielding a plurality of data points for sonar depth, the sonar signal processor can calculate the water-level offset based on the sonar-indicated and chart-indicated depths for the plurality of locations.

In some embodiments the depth ranges comprise depth rings each generally having one edge corresponding to a minimum value and an opposite edge corresponding to a maximum value. The depth rings can comprise polygon rings in some embodiments.

The depth range indicators can comprise colors, each depth ring having a corresponding unique color.

In some embodiments, the processor calculates the chart-indicated depth by interpolation between the two edges of the corresponding depth ring and determines an offset value for each location, and calculates the water-level offset by averaging the offset values for the plurality of locations. When the depth ring at issue has only a minimum value, interpolation is not performed and the minimum value is assigned to the location.

Alternatively, a pre-calculated database can be stored in the non-transitory computer-readable storage medium, the database corresponding to the chart and defining a spatial coordinate grid with a coarser resolution than a spatial resolution of the chart, the database including for each grid point a depth pre-calculated by interpolation on the chart. The database can be a layer of the digitized chart. In this case, the processor performs step (b) by a technique selected from the group consisting of a nearest neighbor method (which uses the closest grid point), a bilinear interpolation method (which basically uses four corners of the grid bounding the point), and a bicubic interpolation method.

In some embodiments, the processor determines sonar-indicated depths for a plurality of different locations within one depth ring, determines an offset value for each of the locations in the one depth ring, and determines an average offset value for the one depth ring. Then the processor determines the water-level offset based on the average offset value.

The processor can similarly determine an average offset value for at least one additional depth ring, and can calculate the water-level offset based on a combination of the various average offset values determined individually for the various depth rings.

In some embodiments the processor performs statistical data analysis on the plurality of data points to determine a confidence level for each data point. The processor can discard one or more data points based on the confidence level falling below a predetermined threshold.

The processor can further performs the step of quantifying a degree of confidence in the accuracy of the calculated water-level offset and can compare the degree of confidence with a predetermined threshold level. The processor can then cause the depth range indicators of the chart to be adjusted if and only if the degree of confidence is above the predetermined threshold level.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

FIG. 4 illustrates an example of a plurality of data points as shown in FIG. 2, listing their associated depth rings from the chart in FIG. 2, and exemplary sonar depths determined for each of the data points.

DETAILED DESCRIPTION OF EMBODIMENTS

Figure 1:
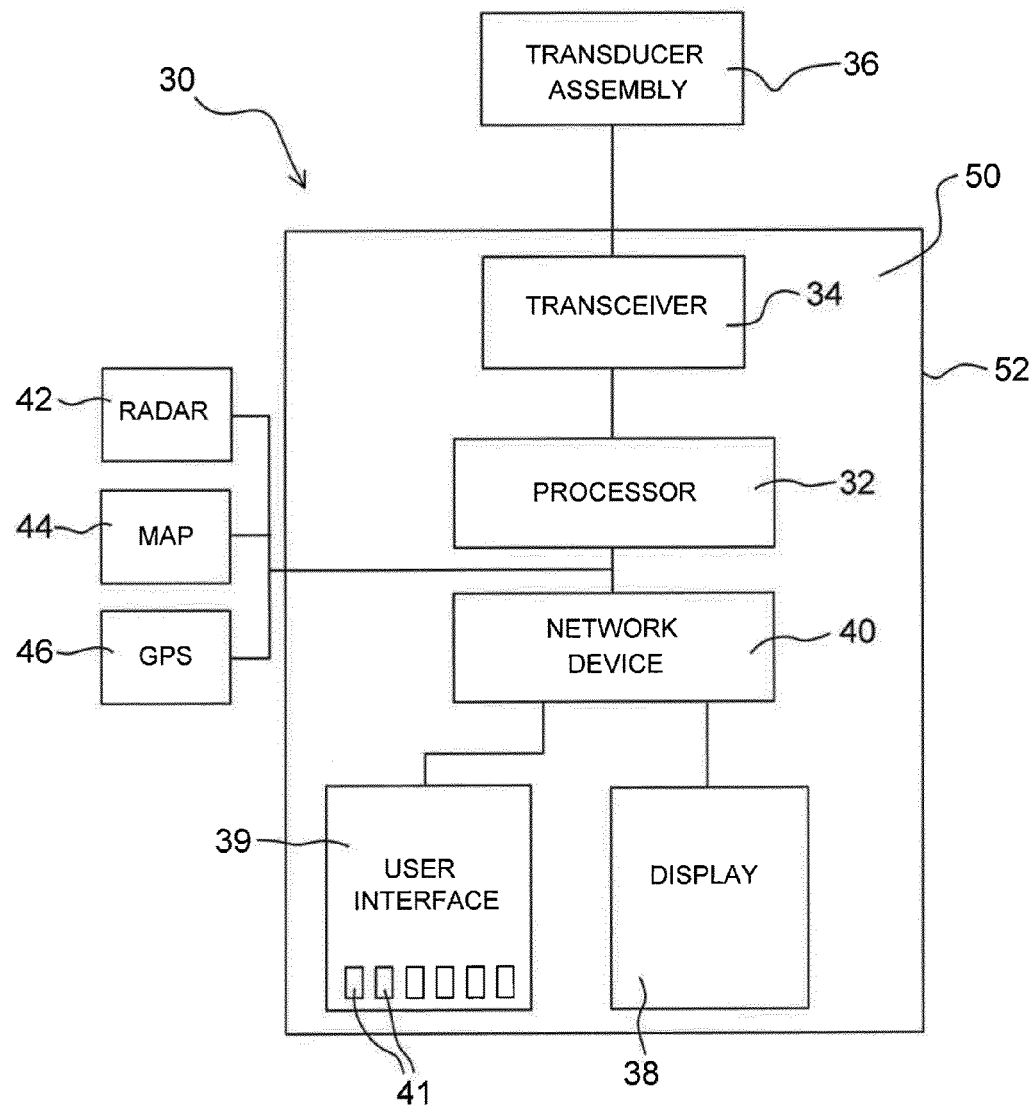
FIG. 1 is a basic block diagram illustrating a sonar system, in accordance with example embodiments described herein.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 is a basic block diagram illustrating a sonar system 30 capable for use with example embodiments of the present invention. The sonar system 30 may include a number of different modules or components, each of which may comprise any device or means embodied in either hardware, software, or a combination of hardware and software configured to perform one or more corresponding functions. For example, the sonar system 30 may include a processor 32, a transceiver 34 and a transducer assembly 36. One or more of the components may be configured to communicate with one or more of the other components to process and/or display data, information, or the like from one or more of the components. The components may also be configured to communicate with one another in any of a number of different manners including, for example, via a network device 40. In this regard, the network device may be any of a number of different communication backbones or frameworks including, for example, Ethernet, a NMEA 2000 framework, or other suitable network device. The network device may also support other data sources, including radar 42, a non-transitory computer-readable storage medium 44 storing a digital nautical chart or map, a GPS device 46, autopilot, engine data, compass, a clock for time data, a temperature sensor for temperature data, etc.

In accordance with the invention, the system 30 includes a multi-function display unit 50. The multi-function display unit includes a housing 52. Accommodated within or by the housing is at least one or more display screens 38. The multi-function display unit can also include a user interface 39 configured to receive an input from a user. The processor 32 may be located within the housing 52 as illustrated, or alternatively may be in a separate module.

The display screen(s) 38 may be configured to display images and may include or otherwise be in communication with the user interface 39. The display screen(s) 38 may be, for example, conventional LCD (liquid crystal display), touch screen(s), or any other suitable display devices known in the art upon which images may be rendered. Although each display screen 38 is shown as being connected to the processor 32 via the network device 40, the display screen could alternatively be in direct communication with the processor 32 in some embodiments. The user interface 39 may include, for example, function keys 41, a keyboard, keypad, mouse, scrolling device, input/output ports, touch screen, or any other mechanism by which a user may interface with the system. Moreover, in some cases, the user interface 39 may be a portion of one or more of the displays 38.

In an example embodiment, the transceiver 34 and network device 40 may also be accommodated within the housing 52 of the multi-function display unit 50 as shown. For example, in some cases, the transducer assembly 36 may simply be placed into communication with the multi-function display unit 50 (e.g., by connecting a cable from one to the other), which may itself be a mobile device that may be placed (but not necessarily mounted in a fixed arrangement) in the water craft to permit easy installation of the unit and so that the one or more displays 38 are viewable by an operator.

The processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 32 as described herein. In this regard, the processor 32 may be configured to analyze electrical signals communicated thereto by the transceiver 34 to provide sonar data indicative of the size, location, shape, etc. of objects detected by the sonar system 30. For example, the processor 32 may be configured to receive sonar return data and process the sonar return data to generate sonar image data for display to a user (e.g., on display 38).

In some cases, the processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the processor 32 may execute commercially available software for controlling the transceiver 34 and/or transducer assembly 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include (or be in communication with) circuitry for providing one or more transmission electrical signals to the transducer assembly 36 for conversion to sound pressure signals based on the provided electrical signals to be transmitted as a sonar pulse. The transceiver 34 may also include (or be in communication with) circuitry for receiving one or more electrical signals produced by the transducer assembly 36 responsive to sound pressure signals received at the transducer assembly 36 based on echo or other return signals received in response to the transmission of a sonar pulse. The transceiver 34 may be in communication with the processor 32 to both receive instructions regarding the transmission of sonar signals and to provide information on sonar returns to the processor 32 for analysis and ultimately for driving one or more of the displays 38 based on the sonar returns.

The transducer assembly 36 according to an exemplary embodiment may be provided in one or more housings that provide for mounting with respect to a hull of the water craft or trolling motor on which the sonar system 30 is employed. In this regard, for example, the housing may be mounted onto the hull of the water craft or onto a device or component that may be attached to the water craft (e.g., a trolling motor or other steerable device, or another component that is mountable relative to the hull of the water craft), including a bracket that is adjustable on multiple axes, permitting rotation of the housing and/or the transducer elements contained therein.

The transducer assembly 36 includes at least one transducer element positioned within the housing and operable to convert electrical energy into sound or vibrations at a particular frequency. A sonar sound beam is transmitted straight down through the water and is reflected from the bottom. The same transducer may receive the reflected sound (the "sonar returns") and convert the sound energy into electrical energy, or alternatively a dedicated receive-only element may perform this task. Based on the known speed of sound and the time required for the sonar return to reach the receiver, the distance to the bottom is determined by processing of the transducer signals by the sonar signal processor 32.

The processor 32 is also in communication with the storage medium 44 that stores the digital map or chart. As such, the processor has access to data relating to the sonar-indicated depth at the water craft's location, and additionally has access to data from the chart indicating the depth range corresponding to the location. These pieces of data can be used for determining a water-level offset. As a simple example, assume the location of the water craft is directly on the maximum-depth edge of the 2 to 4 feet depth range in FIG. 2. The processor determines based on the chart that the chart-indicated depth is 4 feet. Assume the sonar indicates a depth of 3 feet. In a simple approach, the processor can calculate a water-level offset of −1 foot.

Figure 2:
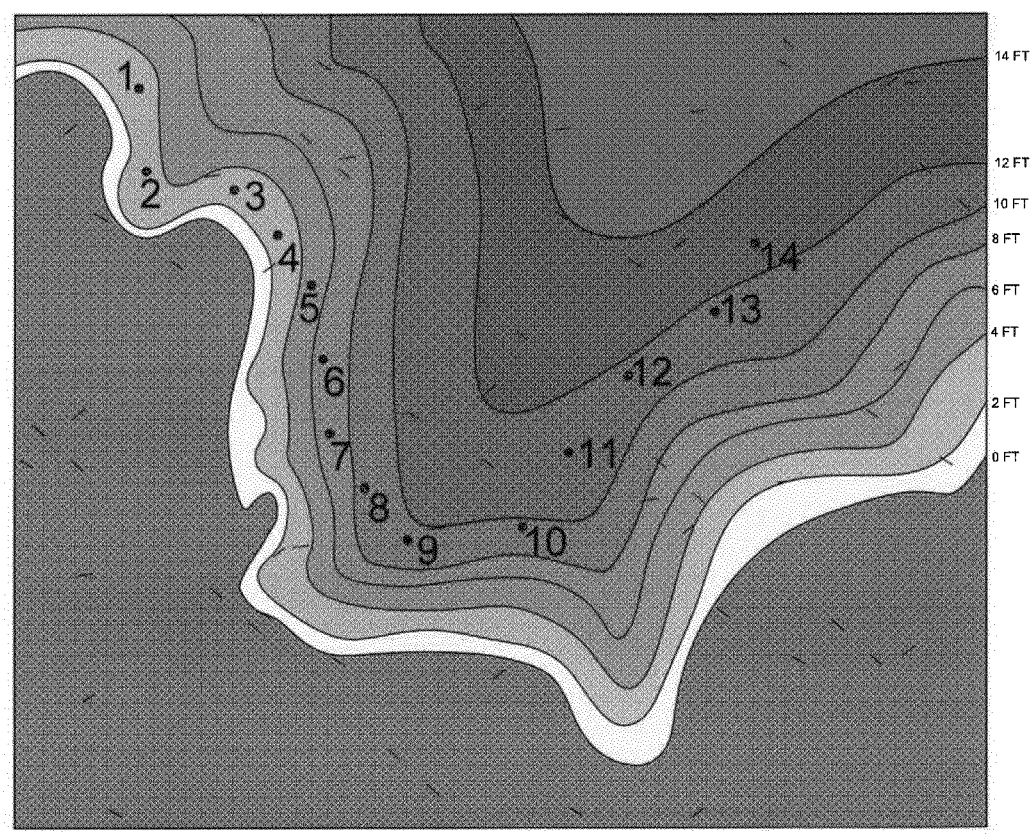
FIG. 2 is a simplified example of a nautical chart having depth ranges in the form of depth rings.
Figure 3:
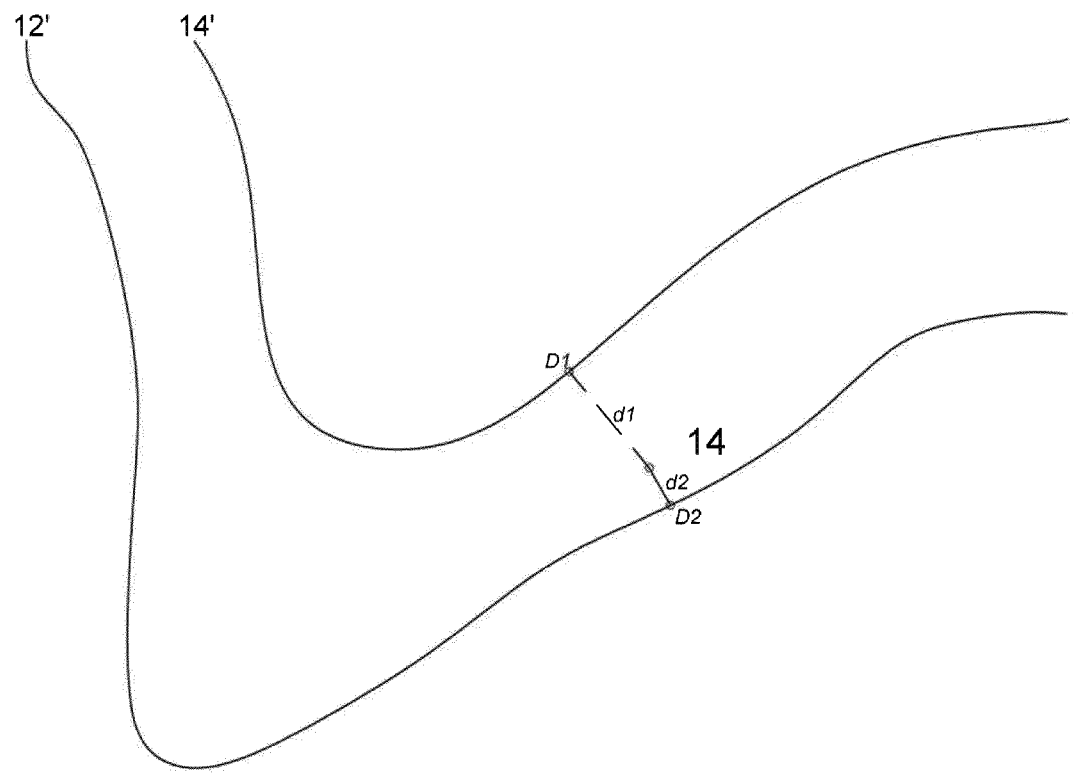
FIG. 3 is a magnified portion of the chart of FIG. 2, showing the 12 to 14 feet depth ring and its associated minimum and maximum edges, and data point #14 located intermediate between these edges.

Of course, the water craft's location generally will be somewhere in between the minimum and maximum edges of a depth ring. For example, FIG. 3 shows a magnified portion of FIG. 2, and depicts a location (designated "14") between the min and max edges of the 12 to 14 feet depth ring. Determining the chart-indicated depth of this location can be done via interpolation. Designating the chart depth at one edge as D1 and the depth at the other edge as D2, and designating the distance from the data point to the one edge as d1 and the distance to the other edge as d2, the depth at the data point location can be calculated as:

$$D=[(D1/d1)+(D2/d2)]/[(1/d1)+(1/d2)]$$

Any other suitable technique can be used for determining the chart-indicated depth at the location corresponding to a sonar depth data point.

Even with the refinement of interpolation, use of a single sonar depth data point for determining water-level offset would be of suspect reliability. A single data point provides no indication of the reliability of the sonar reading. Thus, unless the depth indicated by the sonar were obviously far off, neither the processor nor the operator would have any rational basis for disregarding it. Accordingly, adjusting the chart based on a single sonar sounding compared to the chart, while possible (and within the scope of the appended claims), is probably impractical, and is certainly fraught with potential inaccuracy.

Accordingly, in some embodiments of the present inventions, further refinement is built into the data-processing algorithms. In particular, as shown in FIG. 2, a plurality of data points are acquired by the processor by taking sonar soundings at a plurality of locations on the body of water. In the illustrated example, 14 locations are sounded, yielding 14 data points. The data from all of these 14 data points, or a selected subset thereof, can then be used for determining the water-level offset based on comparison to the chart-indicated depths of the various points.

Preferably the various data points do not all come from the same location of the body of water, since this would increase the likelihood that the readings are not actually representative of the true water-level offset. That is, if there is a high number of points coming from one bad spot in a lake, this could throw off the algorithm for the rest of the lake. Accordingly, the density or distribution of data points ideally should be selected with this in mind.

Averaging out of data points from various depth ranges can help to ameliorate the above-noted density or distribution problem. Thus, collecting depth sounds for each of a plurality of depth ranges and comparing the results for the different depth ranges can be advantageous. For example, assume the system acquires 3-4 foot soundings in the 2-4 depth range indicated by the chart. Additionally, assume there are 4-5 foot soundings in the 4-6 depth range of the chart. Taken independently, the data from the 2-4 depth range would indicate the water was ½ foot high+/−½ foot. Taken independently, the data from the 4-6 depth range would indicate the water was ½ foot low+/−½ foot. However, taken together, it would be determined that the lake level is at the standard level. This is a speed of calculation versus accuracy trade-off.

More generally, there are a number of ways to calculate the water-level offset, some being better and/or faster than others:
  Interpolation—Fairly slow and with a fair amount of exceptions. Determine difference from interpolated point and average the differences together to get overall.
  Interpolation that has been pre-calculated—Compare against points of a pre-calculated database or map layer comprising a 3D grid or an image grid. At each grid point the chart depth is pre-calculated using a suitable interpolation scheme. The database or layer is stored along with the chart. The advantage is there is no need to calculate the current depth point; rather, it is simply looked up in the pre-calculated database, by any suitable technique such as the nearest neighbor method, the bilinear interpolation method, or the bicubic interpolation method. The disadvantage is this technique would be slightly less accurate, as it would have some generalization of the data (either because of a coarse data resolution or because minute depth changes are typically culled out when compression occurs).
  Determine range of soundings for each depth range, calculate an average difference for the entire depth range, and average it against others. This averaging method takes a number of depth ranges with a number of perceived offsets, and averages together all the offsets to get the final water-level offset. This should be fast, but potentially may be somewhat inaccurate.
  Determine range of soundings for each depth range, calculate an average difference for the entire depth range, and by process of elimination against the other depth ranges determine what the offset is. This mutually exclusive method is a puzzle method that solves for the final offset based off all the clues. This should be reasonably fast.

The averaging method and the mutually exclusive method would likely need to take into account the confidence level (0-99%) of the depth range. It would not employ a straight average but would preferably cull out the least-confident results before performing the averaging. Preferably, before the processor made any changes to the rendering of the chart (e.g., adjusting the depth range indicators, such as the contour line labels and/or the correlation between colors and depth ranges), a threshold would be applied. Thus, if the processor determined that the confidence level were above the threshold, it would adjust the rendering of the chart; otherwise, it would not, and the standard chart would be displayed.

Thus, in preferred embodiments a suitable statistical data analysis is performed on the data points to determine if any data points are outliers and should be discarded. Other statistical data-checking techniques can be used to ensure that the data used for water-level offset calculation is reliable. For example, a modification of a standard deviation can be used to handle the traditional mean as a range as wide as the depth range, combined with a check to see if the range in soundings is as wide as the depth range.

Determination of the water-level offset from a set of data points will now be explained by reference to an example illustrated in FIGS. 2 and 4. As noted, there are 14 data points corresponding to 14 different locations on the body of water. The 14 data points come from six different depth ranges. Each depth range will be analyzed separately, and in the process various techniques as previously described will be illustrated.

Depth Range 2-4 Feet

There are four data points: #1—6.8 feet, #2—4.5 feet (unidentified low point), #3—6 feet, and #4—5.5 feet.

We first cull out data points that cause the range of data to exceed the 2-foot range of the depth ring, following a chosen approach such as culling out more low readings than high readings (since it is more likely to get erroneous low readings than erroneous high readings). For instance, three times as many low readings as high readings may be culled. In this case, data point #2 is culled out.

Next, we identify a Mean Depth Range from the remaining data points. In this case, it is 5.5 feet to 6.8 feet+/−0.7 feet.

We then identify the Water-Level Offset as being between 2.8 feet and 3.5 feet.

We next identify the standard deviation as the square root of ⅓ (i.e., the square root of the inverse of n−1, where n is the number of data points), or 0.5774.

Depth Range 4-6 Feet

There is only one data point in this depth ring, #5-8 feet. Accordingly, we identify the Mean Depth Range as 8 feet+/−2 feet, the Water-Level Offset as 2 to 4 feet, and the standard deviation as 0.

Depth Range 6-8 Feet

We have two data points in this depth ring: #6—9.5 feet, and #7—10 feet. We thus identify the Mean Depth Range as 9.5 feet to 10 feet+/−1.5 feet, the Water-Level Offset as 2 to 3.5 feet, and the standard deviation as 0.

Depth Range 8-10 Feet

There are three data points: #8—11.5 feet, #9—10.8 feet (unidentified low point), and #10—12.8 feet. We identify the Mean Depth Range as 10.8 feet to 12.8 feet+/−0 feet, the Water-Level Offset as 2.8 feet, and the standard deviation as 0.

Depth Range 10-12 Feet

There are three data points: #11—12.5 feet (unidentified low point), #12—15.4 feet (unidentified high point), and #13—14.8 feet. We cull out the 12.5 feet low point (3 to 1 ratio to get to 2 feet range). We identify the Mean Depth Range as 14.8 to 15.4 feet+/−1.4 feet, the Water-Level Offset as 3.5 to 4.8 feet, and the standard deviation as SQRT[(2.3*2.3)/2] =1.63.

Depth Range 12-14 Feet

There is a single data point: #14—15.8 feet. We identify the Mean Depth Range as 15.8 feet+/−2 feet, the Water-Level Offset as 1.8 to 3.8 feet, and the standard deviation as 0.

Analysis Based on Puzzle Method

The puzzle method seeks to find the water-level offset that fits the most number of, and the surest, depth ranges in the data. In this case, a water-level offset of 2.8 feet fits the most and surest ranges. It does not fit the 10 to 12 feet range, but that range has a fairly low confidence level.

Analysis Based on Averaging

In this approach, greater confidence is placed in an average that fills the entire range than a few outlier readings. In this illustrative example it is difficult to tell without assigning percentiles to each, but the 8-10 feet range is identified as very high confidence and it indicates the water-level offset would be very close to 2.8 feet. The next most confident range is the 2-4 feet range, which has a water-level offset of 2.8 to 3.5, indicating that the probable average might be closer to 2.9 or 3 than it is to 2.8.

SUMMARY

These two approaches result in respective estimated water-level offsets that are very close to each other. The accuracy would be improved with more depth soundings.

The automatic water-level offset method and apparatus described herein could be used in a number of applications, including but not limited to contour adjustment on chart, shallow water adjustment, palletized ranges, automatic calculation of tide levels when away from a known tide station, and others.

As noted, color palettes can also be useful in the presentation of various types of data to a user in an easily readable manner. Exemplary uses of color palettes that may complement the present invention include but are not limited to:

Providing the user with the ability to select which palette to display the depth areas with.

Each palette can have an intended depth it is meant to highlight the differences in; for example, a lot of colors may be used to indicate differences in shallow water but the number of colors will logarithmically tail off once past that shallow water area. One palette may be good at highlighting 100-foot intervals in water but would have next to no separation in shallow water.

The depth ranges may be fine-tunable to user-selected ranges.

The palette can be automatically adjusted for the water-level offset and will display the water above the surface as transparency. The user may be able to turn on/off the auto offset by a checkbox, meaning the palette can work completely independent of the setting.

The palette may be able to display the values of other types of data such as bottom hardness, vegetation density, and any other data representable by numeric ranging or percentage ranging.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for displaying, on a display device carried on a surface water craft traversing a body of water, a depth chart for the body of water, the chart being established on the basis of a standard water level for the body of water, the method comprising the steps of:

providing a digitized nautical chart for a geographic area that includes the body of water and adjacent shoreline, the chart being stored in a non-transitory computer-readable storage medium, the chart defining a plurality of different depth ranges, the chart including information specifying the regions of the geographic area occupied by each of the depth ranges, the chart further including a unique depth range indicator for each depth range, the depth range indicator generally indicating a depth value of the depth range;

obtaining, using at least one sonar transducer, sonar data at each of a plurality of locations along a depth ring of the chart, wherein the sonar transducer produces and receives electronics signals indicative of depth;

calculating, using a sonar signal processor and based on the sonar data, a sonar-indicated depth corresponding to each of the plurality of locations along the depth ring;

determining an average sonar indicated depth for the depth ring based on each sonar indicated depth for the plurality of locations along the depth ring;

determining a chart-indicated depth corresponding to said depth ring;

calculating a water-level offset for the depth ring based on a comparison between the average sonar-indicated depth for the depth ring and the corresponding chart-indicated depth for the depth ring;

adjusting each of the depth range indicators for the depth ring based on the water-level offset; and displaying on the display device the chart with the adjusted depth range indicators.

2. The method of claim 1, wherein each depth ring generally has one edge corresponding to a minimum value and an opposite edge corresponding to a maximum value.

3. The method of claim 2, wherein the depth rings comprise polygon rings.

4. The method of claim 2, wherein the depth range indicators comprise colors, each depth ring having a corresponding unique color.

5. The method of claim 2, wherein for each location, the chart-indicated depth is calculated by interpolation between the two edges of the corresponding depth ring and an offset value is determined for each location.

6. The method of claim 2, further comprising storing, in the non-transitory computer-readable storage medium, a pre-calculated database corresponding to the chart, the database defining a spatial coordinate grid with a coarser resolution than a spatial resolution of the chart, the database including for each grid point a depth pre-calculated by interpolation on the chart, and wherein the chart-indicated depth for each location is determined using the database.

7. The method of claim 6, wherein the chart-indicated depth is determined from the database using a technique selected from the group consisting of a nearest neighbor method, a bilinear interpolation method, and a bicubic interpolation method.

8. The method of claim 1, wherein the depth ring of the chart is a first depth ring of the chart, the method further comprising:

obtaining, using the at least one sonar transducer, second sonar data at each of a plurality of locations along a second depth ring of the chart, wherein the second depth ring is different than the first depth ring of the chart;

calculating, using a sonar signal processor and based on the second sonar data, a sonar-indicated depth corresponding to each of the plurality of locations along the second depth ring;

determining an average sonar indicated depth for the second depth ring based on each sonar indicated depth for the plurality of locations along the second depth ring;

determining a chart-indicated depth corresponding to the second depth ring;

calculating a second water-level offset corresponding to the second depth ring based on a comparison between the average sonar-indicated depth for the second depth ring and the corresponding chart-indicated depth for the second depth ring;

determining an average water-level offset based on the water-level offset for the first depth ring and the second water-level offset for the second depth ring;

adjusting each depth ring of the chart based on the average water-level offset; and displaying on the display device the chart with the adjusted depth rings.

9. The method of claim 1, wherein a statistical data analysis is performed on each sonar-indicated depth for each location to determine a confidence level for each sonar-indicated depth.

10. The method of claim 9, wherein one or more sonar-indicated depths are discarded based on the confidence level falling below a predetermined threshold.

11. The method of claim 1, further comprising:
quantifying a degree of confidence in the accuracy of the calculated water-level offset; and
adjusting the water-level offset based on the calculated water-level offset if and only if the degree of confidence is above a predetermined threshold level.

12. The method of claim 1, wherein the depth ranges comprise contour lines and the depth range indicators comprise depths respectively associated with the contour lines.

13. A sonar system for being carried on a surface water craft traversing a body of water, comprising:
a transducer assembly for emitting depth-sounding sonar pulses and receiving echo returns therefrom indicative of a depth to the bottom of the body of water beneath the water craft, the transducer assembly converting the echo returns into electrical signals;
a sonar signal processor in communication with the transducer assembly to receive the electrical signals therefrom;
a display device in communication with the sonar signal processor;
a non-transitory computer-readable storage medium on which is stored a digitized nautical chart for a geographic area that includes the body of water and adjacent shoreline, the storage medium being in communication with the sonar signal processor, the chart being established on the basis of a standard water level for the body of water, the chart defining a plurality of different depth ranges, the chart including information specifying the regions of the geographic area occupied by each of the depth ranges, the chart further including a unique depth range indicator for each depth range, the depth range indicator generally corresponding to a depth value of the depth range;
wherein the sonar signal processor is programmed to cause the processor to:
obtain, using the transducer assembly, sonar data at each of a plurality of locations along a depth ring of the chart;
calculate, based on the sonar data, a sonar-indicated depth corresponding to each of the plurality of locations along the depth ring;

determine an average sonar indicated depth for the depth ring based on each sonar indicated depth for the plurality of locations along the depth ring;

determine, based on the chart stored in the storage medium, a chart-indicated depth corresponding to said depth ring;

calculate a water-level offset for the depth ring based on a comparison between the average sonar-indicated depth for the depth ring and the corresponding chart-indicated depth for the depth ring;

adjust each of the depth range indicators for the depth ring based on the water-level offset; and cause the display device to display the chart with the adjusted depth range indicators.

14. The sonar system of claim 13, wherein the sonar signal processor receives a GPS signal from a GPS device on the water craft, the GPS signal being indicative of geospatial coordinates of the location of the water craft, and the processor is programmed to look up, in the chart stored in the storage medium, depth information associated with the geospatial coordinates indicated by the GPS signal.

15. The sonar system of claim 13, wherein each depth ring generally has one edge corresponding to a minimum value and an opposite edge corresponding to a maximum value.

16. The sonar system of claim 15, wherein the depth rings comprise polygon rings.

17. The sonar system of claim 15, wherein the depth range indicators comprise colors, each depth ring having a corresponding unique color.

18. The sonar system of claim 15, wherein for each location, the processor calculates the chart-indicated depth by interpolation between the two edges of the corresponding depth ring and determines an offset value for each location.

19. The sonar system of claim 15, further comprising a pre-calculated database stored in the non-transitory computer-readable storage medium, the database corresponding to the chart and defining a spatial coordinate grid with a coarser resolution than a spatial resolution of the chart, the database including for each grid point a depth pre-calculated by interpolation on the chart, and wherein the processor determines the chart-indicated depth for each location using the database.

20. The sonar system of claim 19, wherein the processor determines the chart-indicated depth for each location using a technique selected from the group consisting of a nearest neighbor method, a bilinear interpolation method, and a bicubic interpolation method.

21. The sonar system of claim 13, wherein the depth ring of the chart is a first depth ring of the chart, wherein the sonar signal processor is programmed to cause the processor to:
obtain, using the transducer assembly, second sonar data at each of a plurality of locations along a second depth ring of the chart, wherein the second depth ring is different than the first depth ring of the chart;
calculate, based on the second sonar data, a sonar-indicated depth corresponding to each of the plurality of locations along the second depth ring;
determine an average sonar indicated depth for the second depth ring based on each sonar indicated depth for the plurality of locations along the second depth ring;
determine a chart-indicated depth corresponding to the second depth ring;
calculate a second water-level offset corresponding to the second depth ring based on a comparison between the average sonar-indicated depth for the second depth ring and the corresponding chart-indicated depth for the second depth ring;

determine an average water-level offset based on the water-level offset for the first depth ring and the second water-level offset for the second depth ring;

adjust each depth ring of the chart based on the average water-level offset; and cause display on the display device of the chart with the adjusted depth rings.

22. The sonar system of claim 13, wherein the processor performs a statistical data analysis on each sonar-indicated depth for each location to determine a confidence level for each sonar-indicated depth.

23. The sonar system of claim 22, wherein the processor discards one or more data points based on the confidence level falling below a predetermined threshold.

24. The sonar system of claim 13, wherein the processor is further configured to:

quantify a degree of confidence in the accuracy of the calculated water-level offset; and adjust the water-level offset based on the calculated water-level offset if and only if the degree of confidence is above the predetermined threshold level.

25. The sonar system of claim 13, wherein the depth ranges comprise contour lines and the depth range indicators comprise depths respectively associated with the contour lines.

\* \* \* \* \*